United States Patent
Marxkors et al.

(10) Patent No.: US 9,255,597 B2
(45) Date of Patent: Feb. 9, 2016

(54) SELF-PIERCING RIVET WITH A PRE-PERFORATED FLAT ELEMENT, PRODUCTION METHOD AND JOINING METHOD THEREFOR

(71) Applicant: BÖLLHOFF VERBINDUNGSTECHNIK GMBH, Bielefeld (DE)

(72) Inventors: Andreas Marxkors, Hovelhof (DE); Mathias Heger, Oerlingshausen (DE)

(73) Assignee: BÖLLHOFF VERBINDUNGSTECHNIK GMBH, Bielefeld (DE)

( * ) Notice: Subject to any disclaimer, the term of this patent is extended or adjusted under 35 U.S.C. 154(b) by 0 days.

(21) Appl. No.: 14/390,219

(22) PCT Filed: Apr. 2, 2013

(86) PCT No.: PCT/EP2013/056928
§ 371 (c)(1),
(2) Date: Oct. 2, 2014

(87) PCT Pub. No.: WO2013/150022
PCT Pub. Date: Oct. 10, 2013

(65) Prior Publication Data
US 2015/0056042 A1 Feb. 26, 2015

(30) Foreign Application Priority Data

Apr. 2, 2012 (DE) .......................... 10 2012 102 860

(51) Int. Cl.
*F16B 19/08* (2006.01)
*F16B 5/04* (2006.01)
(Continued)

(52) U.S. Cl.
CPC ............... *F16B 19/086* (2013.01); *B21J 15/36* (2013.01); *F16B 5/04* (2013.01); *B29C 65/564* (2013.01);
(Continued)

(58) Field of Classification Search
CPC .......... F16B 5/04; F16B 19/08; F16B 19/086; F16B 19/10; F16B 19/1027
USPC .......................... 411/500, 501, 503, 506, 509
See application file for complete search history.

(56) References Cited

U.S. PATENT DOCUMENTS 3,432,925 A  3/1969  Woolley
3,919,916 A  11/1975 Alexander
(Continued)

FOREIGN PATENT DOCUMENTS

DE          4412228 A1  10/1995
DE    102005000112 A1   3/2007
(Continued)

OTHER PUBLICATIONS

Translation of International Search Report for application No. PCT/EP2013/056928, dated Jul. 15, 2013, 2 pages.
(Continued)

*Primary Examiner* — Roberta Delisle
(74) *Attorney, Agent, or Firm* — Reising Ethington

(57) ABSTRACT

The present invention discloses a self-piercing rivet (10), particularly a semi-hollow self-piercing rivet, with a head (12) and a shank (14) as well as a pre-perforated flat element (30) that is arranged on the shank (14) and at least part of which extends radially relative to the head (12) beyond a head radius. A production method and a joining method for said self-piercing rivet with pre-perforated flat element are also described.

13 Claims, 16 Drawing Sheets

Figure 1:
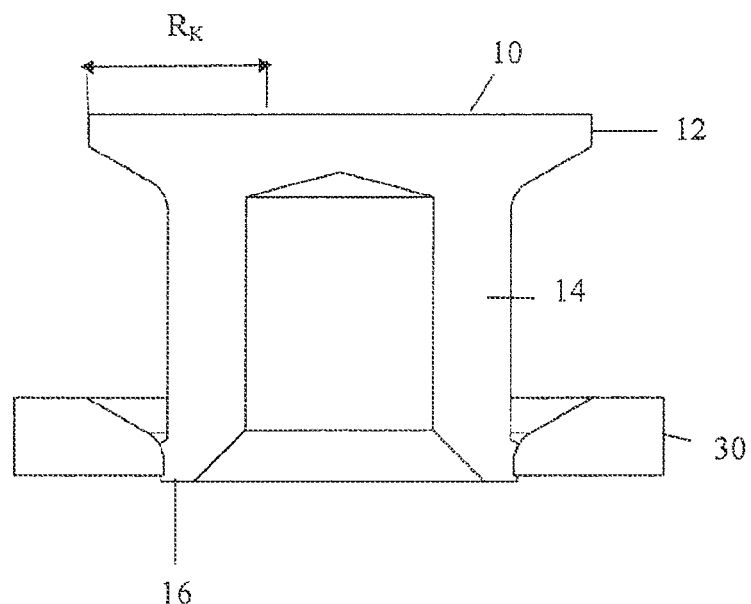

(51) Int. Cl.
*B21J 15/36* (2006.01)
*B29C 65/56* (2006.01)
*B29C 65/64* (2006.01)
*B29C 65/74* (2006.01)
*B29C 65/00* (2006.01)

(52) U.S. Cl.
CPC ............ *B29C 65/64* (2013.01); *B29C 65/7437* (2013.01); *B29C 66/1122* (2013.01); *B29C 66/21* (2013.01); *B29C 66/43* (2013.01); *B29C 66/742* (2013.01); *B29C 66/81422* (2013.01); *B29C 66/81423* (2013.01); *B29C 66/81429* (2013.01); *B29C 66/8322* (2013.01)

(56) References Cited

U.S. PATENT DOCUMENTS

| | | | |
|---|---|---|---|
| 4,003,286 A | | 1/1977 | Hallock |
| 4,231,280 A | | 11/1980 | Gross |
| 4,512,699 A | * | 4/1985 | Jackson et al. ................ 411/368 |
| 4,585,382 A | * | 4/1986 | Bryce, Jr. ........................ 411/34 |
| 5,733,086 A | * | 3/1998 | Jakob ............................. 411/501 |
| 7,284,319 B2 | * | 10/2007 | Kato et al. ...................... 29/798 |
| 7,628,573 B2 | * | 12/2009 | Philipskotter et al. ........ 411/501 |
| 7,762,753 B2 | * | 7/2010 | Jokisch ......................... 411/501 |
| 2002/0006321 A1 | * | 1/2002 | Singh et al. ................... 411/501 |
| 2003/0175095 A1 | * | 9/2003 | Clarke ........................... 411/501 |
| 2004/0068854 A1 | * | 4/2004 | Kato et al. ..................... 29/432.2 |
| 2005/0019137 A1 | * | 1/2005 | Iwatsuki et al. .............. 411/501 |
| 2010/0232906 A1 | * | 9/2010 | Singh et al. ................... 411/501 |
| 2011/0302755 A1 | * | 12/2011 | Wang ........................ 29/402.01 |

FOREIGN PATENT DOCUMENTS

| | | |
|---|---|---|
| DE | 102008005288 A1 | 8/2009 |
| JP | 2006234154 A | 9/2006 |
| WO | 2012117737 A1 | 9/2012 |

OTHER PUBLICATIONS

Written Opinion for application No. PCT/EP2013/056928, dated Jul. 15, 2013, 6 pages.
English translation of the International Preliminary Report on Patentability for PCT/EP2013/056928 dated Oct. 16, 2014, 11 pages.

* cited by examiner

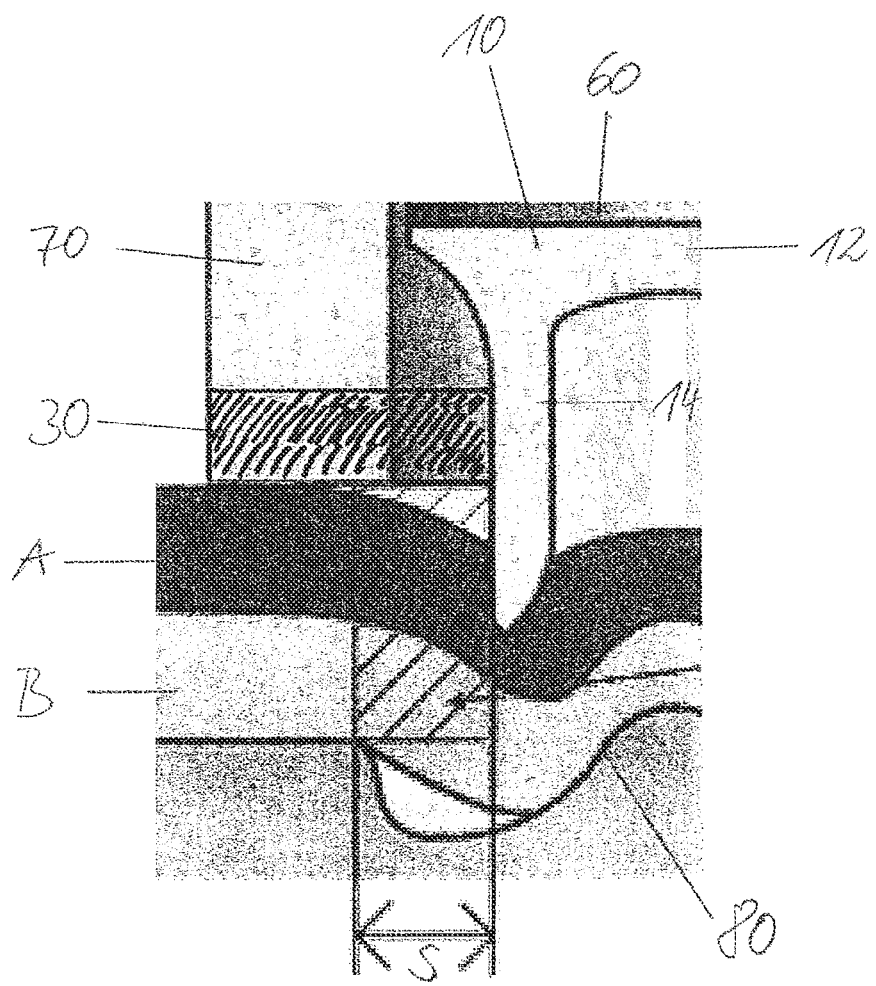

SELF-PIERCING RIVET WITH A PRE-PERFORATED FLAT ELEMENT, PRODUCTION METHOD AND JOINING METHOD THEREFOR

1. FIELD OF THE INVENTION

The present invention relates to a rivet, especially a self-piercing rivet, a method for its production as well as a joining method for this rivet.

2. BACKGROUND OF THE INVENTION

In the field of joining connections, the usage of rivets, especially of semi-hollow rivets, is widely distributed. Therein, a rivet is set or placed in at least two components which are arranged one above the other. Both components support themselves against the die arranged opposite to the joining location, wherein the die in cooperation with the components to be connected and the rivet forms a closing head of the joining connection during the setting process.

In the automotive industry, for example, more and more components consisting of different materials are connected with each other. While the structure component consists of metal, the above lying top-layer uses a soft metal, as for example aluminum, or a plastic as material. The used plastics have a widespread range similar to the underlying structure component. These plastics are not reinforced, or they have fibers or fabric layers which are incorporated into a plastic matrix for their reinforcement.

Based on the different deformation behavior of materials having different characteristics in the top-layer and in the structure component, as for example plastic in the top-layer and metal in the structure component, disadvantages result when producing or creating a rivet connection between such a top-layer and the structure component. This has especially to be ascribed to the different deformation behavior of the two materials. As the plastic is deformed during entry of the rivet such that the reinforcing fibers are released from the plastic matrix or gaps are formed in the created connection between the top-layer and the structural component, the known joining connections do not ensure the quality requirements for example in the automotive industry. The above mentioned disadvantages affect the reduction of the strength of the manufacturing and joining connection as well as the durability of the produced joining connection.

It is thus the object of the present invention to provide a rivet for producing a joining connection with improved characteristics compared to the prior art. Further, the present invention has the object to provide a production method and a joining method for such a rivet.

3. SUMMARY OF THE INVENTION

Further embodiments, modifications and advantages of the present invention result from the following description, the accompanying drawings and the appending claims.

The rivet according to the invention, especially a self-piercing rivet, comprises the following features: a head and a shank as well as a pre-punched two-dimensional element which is arranged on the shank and which protrudes radially at least partly beyond a head radius with respect to the head.

The rivet according to the invention presents a combination of a rivet of known construction and a pre-punched two-dimensional supporting element on its shank, preferably fixed. This pre-punched two-dimensional element or supporting element serves to realize a supporting and compression effect within the area of the joining connection by means of a tool, for example a hold-down device, so that the creation of the joining connection between the top-layer, for example a plastic component, and the structural component, for example made of metal, is supported. As the supporting element protrudes in radial direction beyond the head radius of the head of the rivet, a pressure force of the hold-down device will not only achieve a compression effect in a radially toroidal portion below the working surface or abutting surface of the hold-down device but also below the working surface of the pre-punched two-dimensional element on the top-layer. This compression effect contributes thereto that despite of a different material behavior of the top-layer and the structure component an adequate joining connection from for example at least a plastic top-layer and a structure component from metal is creatable. To this end, the pre-punched two-dimensional supporting element is arranged on the shank tightly or movably. It is also preferred to release the initially tight connection between shank and pre-pierced two-dimensional supporting element during the joining method so that the pre-punched two-dimensional supporting element is newly positionable on the shank in a sliding manner.

According to a preferred embodiment of the present invention, the pre-punched two-dimensional element on the shank of the rivet is arranged captive or non-releasably between the head and an end of the shank opposite to the head, preferably tightly or loosely. By means of this construction it is ensured that the combination of rivet and pre-punched two-dimensional element is deliverable to a setting device like a common rivet. Therefore, no additional supplying or positioning steps on the components to be joined are necessary for the pre-punched two-dimensional element. Further, and based thereon, the preferred rivet according to the invention may be transported as bulk without the requirement of additional installation work of rivet and pre-punched two-dimensional element at the future processing site.

According to a further preferred embodiment of the present invention, the rivet and the pre-punched two-dimensional element are first combined with each other during the joining procedure. In doing so, the rivet and the pre-punched two-dimensional element are positioned so that the shank passes through a hole in the pre-punched two-dimensional supporting element at the beginning of the joining method before the shank penetrates the components to be joined. According to a further alternative of the method, the pre-punched two-dimensional supporting element is positioned on the shank before joining and thereafter the joining procedure is started.

According to the invention, the pre-punched two-dimensional element realizes preferably a supporting and compression function below the head and adjacent to the shank of the rivet, which cannot be realized by known hold-down device constructions due to their abutment radially outside of the head radius. Depending on the space available for the joining connection to be produced or in the hold-down device construction by means of which a pressure force shall be applied to the joining area, the pre-punched two-dimensional element has preferably different shapes. According to an embodiment, the pre-punched two-dimensional element is a circular disc having a central opening in which the shank of the rivet is arranged. It is further preferred, to provide the pre-punched two-dimensional element in an elongated shape having a central opening for the shank of the rivet so that diametrically opposed bracket-like extensions protrude beyond the head radius at which a classical hold-down device may abut. In this context, it is also preferred that the pre-punched two-dimensional element extends only at one position beyond the head radius with respect to the circumference of the head of the rivet to form a working surface for the hold-down device there. In case of sufficient stability of the pre-punched two-dimensional element, a sufficient transfer of pressure forces in the area below the head of the rivet and adjacent to the shank of the rivet would be ensured also at this construction alternative.

According to a further preferred embodiment of the present invention, the pre-punched two-dimensional element is fixed to the shank adjacent to the end of the shank facing away from the head, for example by means of a frictional connection or form-fit/positive-fit connection. It is further preferred that the end of the shank facing away from the head is spaced or positioned less than 2/10 of an overall length of the shank from a side of the pre-punched two-dimensional element facing the end of the shank which is facing away from the head.

The preferred fastening of the pre-punched two-dimensional element on the shank of the rivet supports the already above discussed easy processability of the rivet with pre-punched two-dimensional element. Further, the pre-punched two-dimensional element may be positioned more exactly as far as the pre-punched two-dimensional element is fastened on the shank of the rivet. Such a fastening is realizable as force-fit or form-fit connection. A force-fit connection or frictional connection between the outside of the shank of the rivet and the inside of an opening of the pre-punched two-dimensional element may be created in several ways. An embodiment consists of forming the opening in the pre-punched two-dimensional element with an undersize with respect to the outer radius of the shank of the rivet. According to a further alternative, the shank is widened after the pre-punched two-dimensional element was slipped on the shank of the rivet, for example prized open or compressed, so that a frictional connection between the shank of the rivet and the pre-punched two-dimensional element is formed. As the shank is thickened due to the widening, it is also preferred to movably retain the pre-punched two-dimensional element with a form-fit or a positive-fit between the thickening of the shank and the head of the rivet.

It is also preferred to form an end radius of the end of the shank facing away from the head larger than a shank radius of the shank between the head and the end of the shank of the rivet facing away from the head. Based on this shaping, also the stability of the joining connection to be produced is improved as preferably an undercut is formed in the joining connection viewed in the longitudinal direction of the shank of the rivet. This undercut provides a higher strength between the rivet, the top-layer and the underlying structural component.

The present invention discloses further a production method for a rivet, especially a self-piercing rivet, having the following steps: providing a rivet and a pre-punched two-dimensional element and arranging, preferably captive, the pre-punched two-dimensional element on a shank of the rivet so that the pre-punched two-dimensional element protrudes at least partly beyond a head radius with respect to a head of the rivet. In a further preferred embodiment of the present production method, the pre-punched two-dimensional element has the shape of a circular or polygonal disc with a central opening. This circular disc or any other formed pre-punched two-dimensional element is fixed on the shank of the rivet by widening the shank of the rivet. In this manner, a frictional connection between the inside of the opening of the pre-punched two-dimensional element and the outside of the shank of the rivet is formed. It is also preferred to form the opening of the pre-punched two-dimensional element with undersize with respect to the diameter of the shank of the rivet to be able to create in this manner a frictional connection between the pre-punched two-dimensional element and the shank of the rivet when the pre-punched two-dimensional element is pressed onto the shank.

The present invention discloses further a joining method for a rivet, especially a rivet having a pre-punched two-dimensional element protruding radially at least partly beyond a head radius with respect to a head of the rivet. The joining method comprises the following steps: arranging at least a first component above a second component, supplying the rivet having a pre-punched two-dimensional element arranged on the shank of the rivet to a joining location, or supplying the rivet and supplying the pre-punched two-dimensional element to a joining location, pressing the pre-punched two-dimensional element on the first component by means of a tool, especially a hold-down device, wherein a die arranged oppositely to the pre-punched two-dimensional element applies a sufficient or a variable counterforce, and setting the rivet by means of a setting tool into the at least first and second component, wherein the pre-punched two-dimensional element surrounds the shank of the rivet.

The joining method preferred according to the invention is performed in combination with a die having a movable supporting element, according to a further alternative. Therefrom, the further steps result: supporting the components to be connected within a cavity of the die during the joining procedure and moving the supporting element at least partly out of the cavity of the die during the joining procedure to specifically uncover the cavity of the die for displaced material of the components to be connected.

By means of the dies having a movable supporting element, a counterforce is set against the material urged into the cavity, wherein the counterforce influences the setting of the rivet into the components to be connected. The counterforce applied by the movable supporting element is preferably controlled or regulated to take account of characteristics of different materials of the components to be connected.

With respect to the above described joining method, the present invention further comprises a die for producing a rivet connection with the above mentioned movable supporting element. This die comprises the following features: a cavity, in which displaced material of at least one component is receivable, and a movable supporting element, which fills the cavity of the die at least partly and which is movable into the cavity of the die and out of the cavity of the die. By means of this specific die construction, the above described joining method is realizable for rivets with or without pre-punched two-dimensional element.

The joining method according to the invention is based on the coordinated construction of rivet and pre-punched two-dimensional element. As the pre-punched two-dimensional element protrudes in radial direction beyond the head radius of the head of the rivet, a hold-down device force may also be transferred into the portion below the head of the rivet before and during the creation of the joining connection. In this manner, especially the joining of components of different material characteristics is supported, as for example top-layer from plastic and a structure component made of metal.

Accordingly, the present invention comprises also a first and a second component connected with each other via a rivet according to the above described construction.

4. SHORT DESCRIPTION OF THE ACCOMPANYING DRAWINGS

Figure 2:
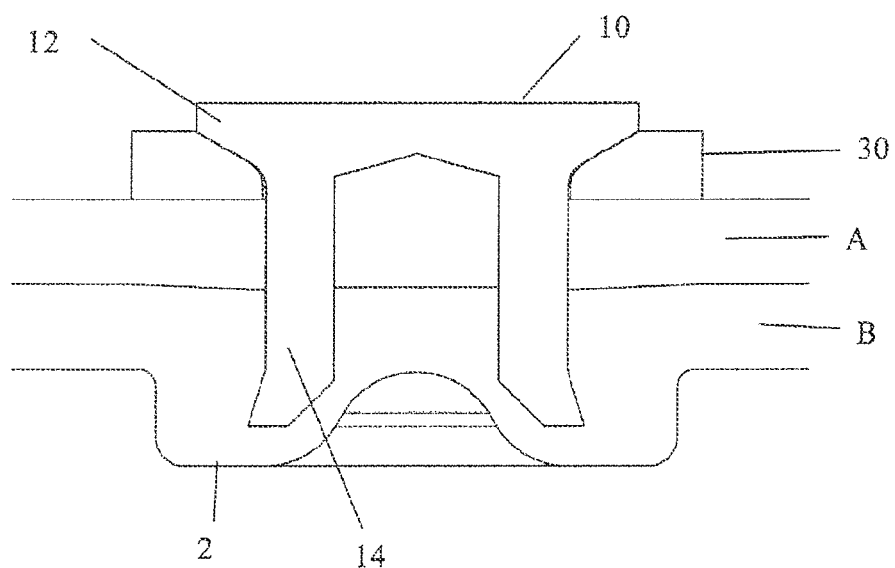
Figure 3:
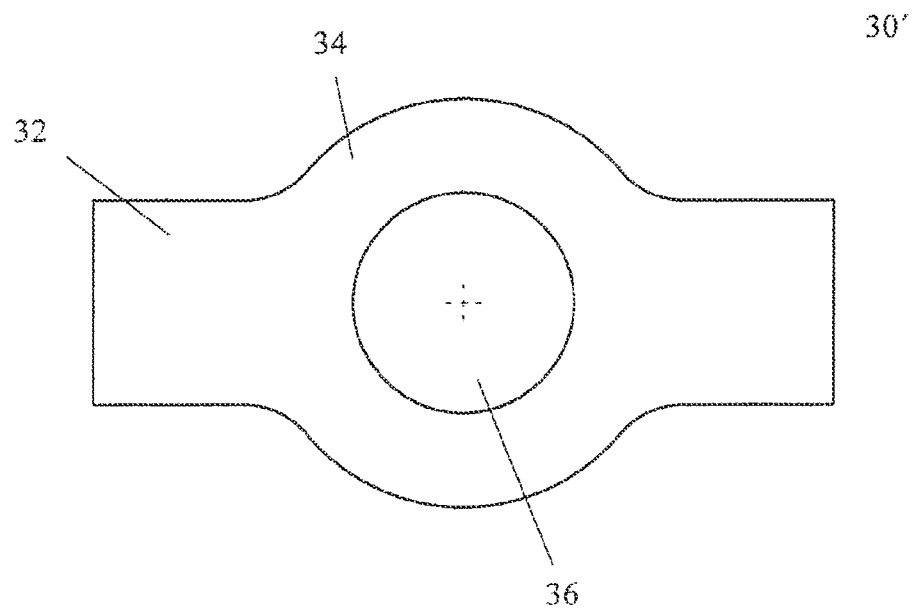
Figure 4:
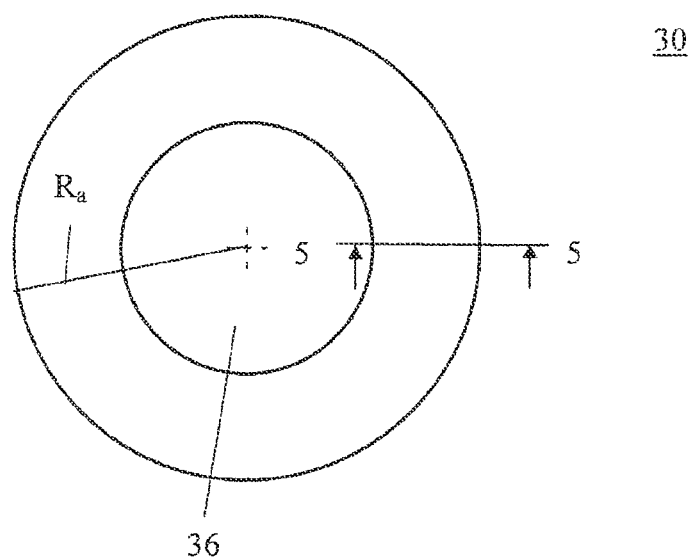
Figure 5:
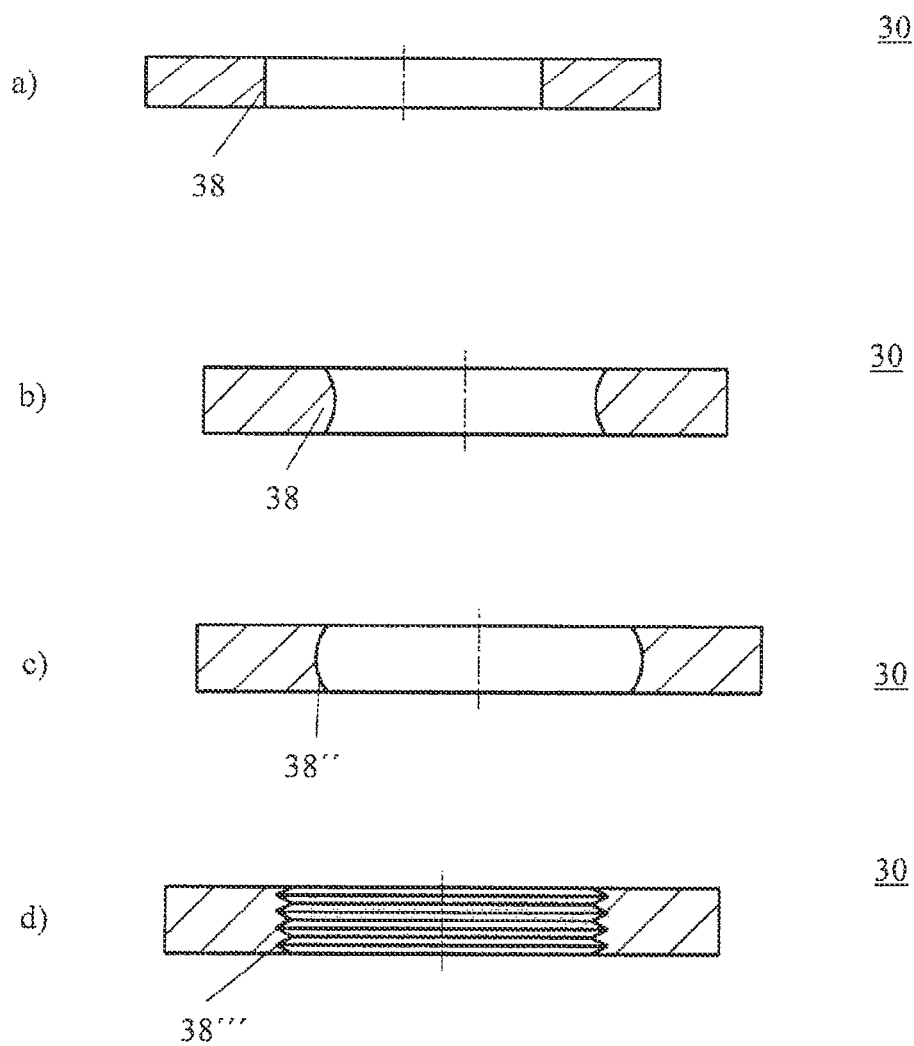
Figure 6:
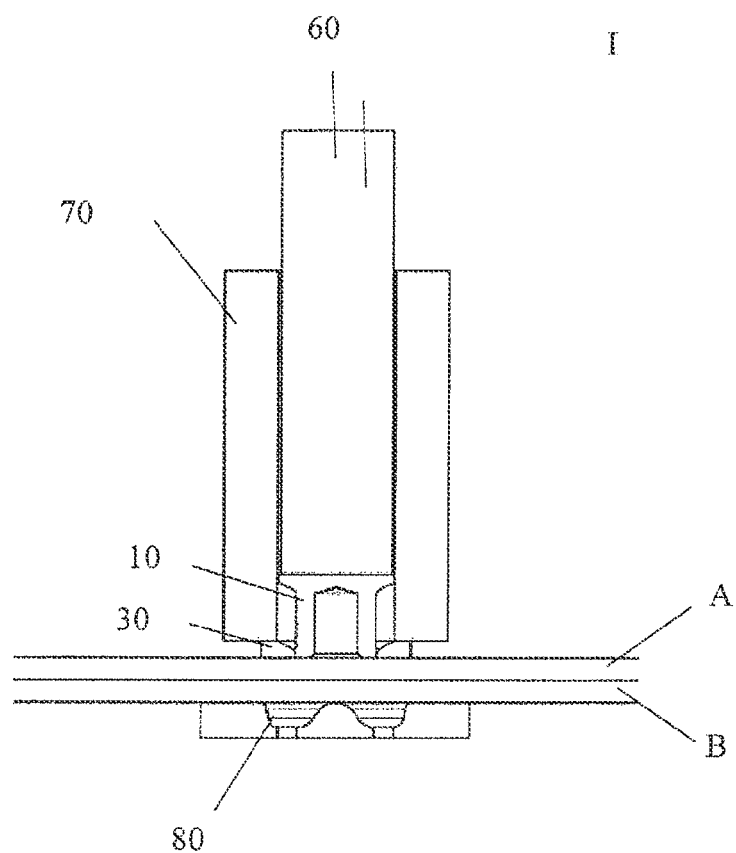
Figure 6:
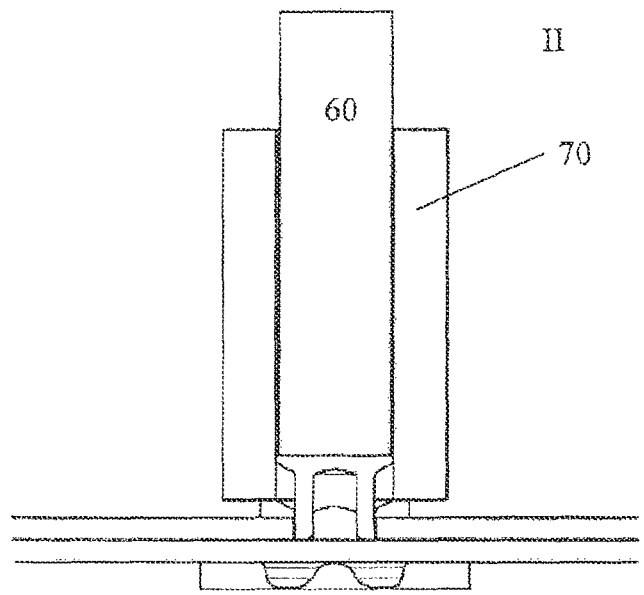
Figure 6:
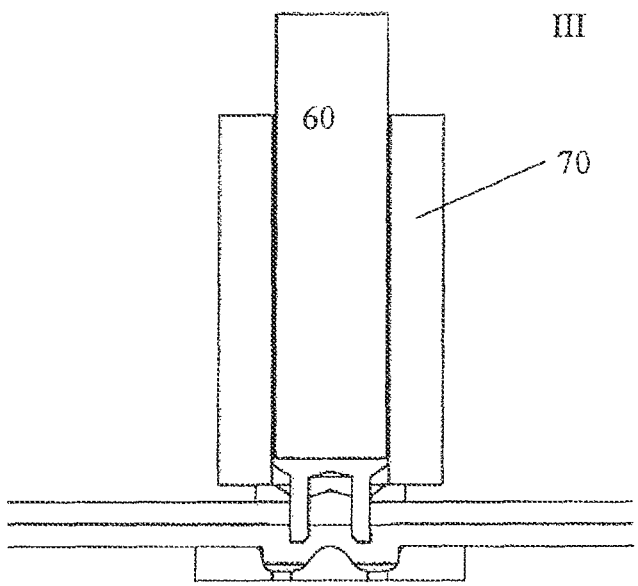
Figure 6:
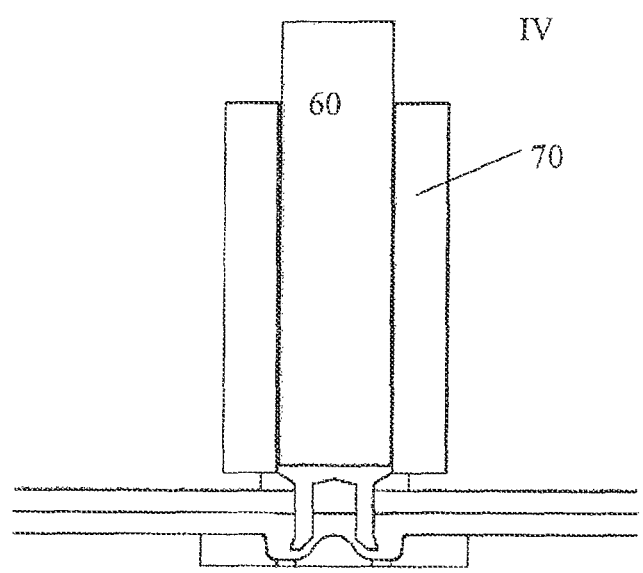
Figure 6:
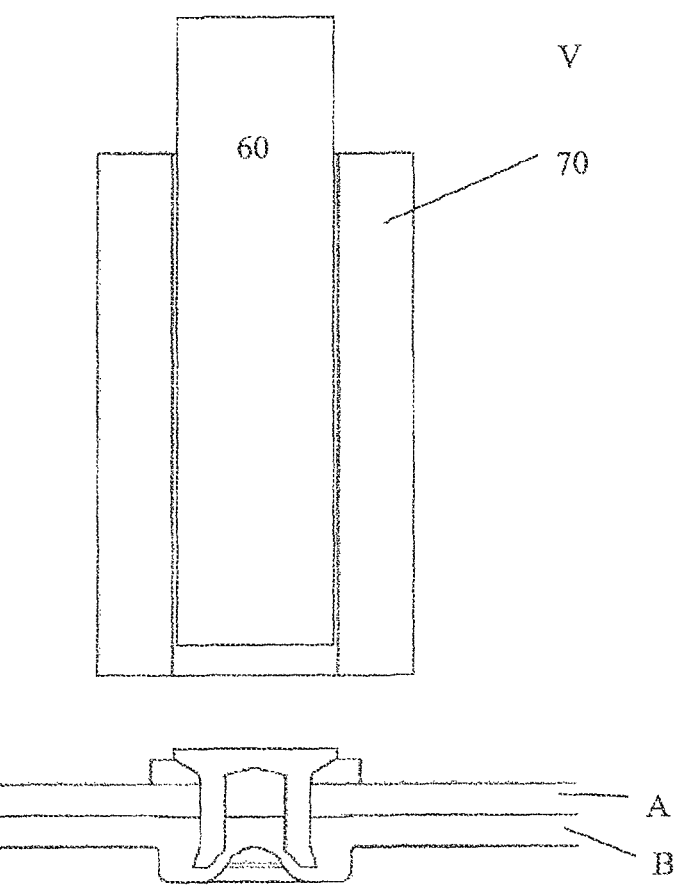
Figure 7:
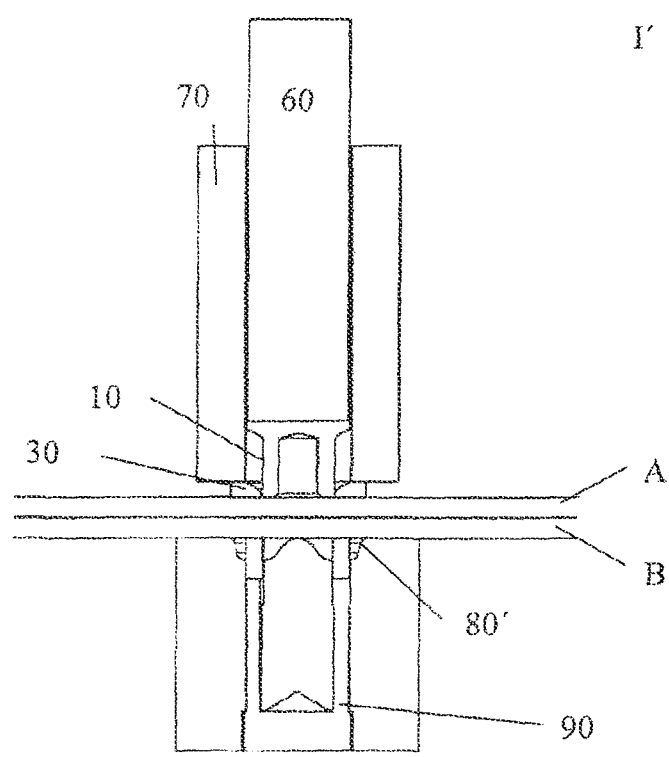
Figure 7:
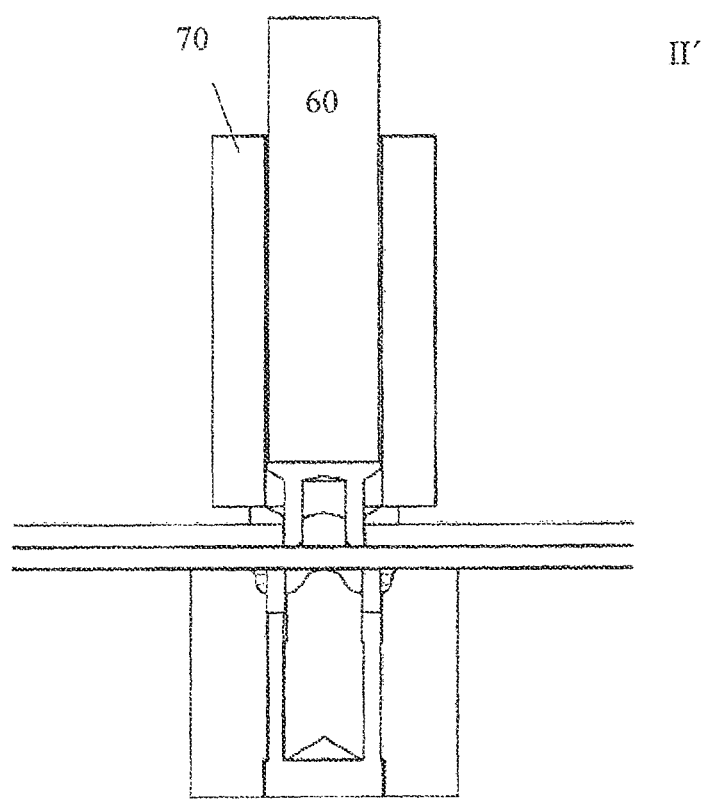
Figure 7:
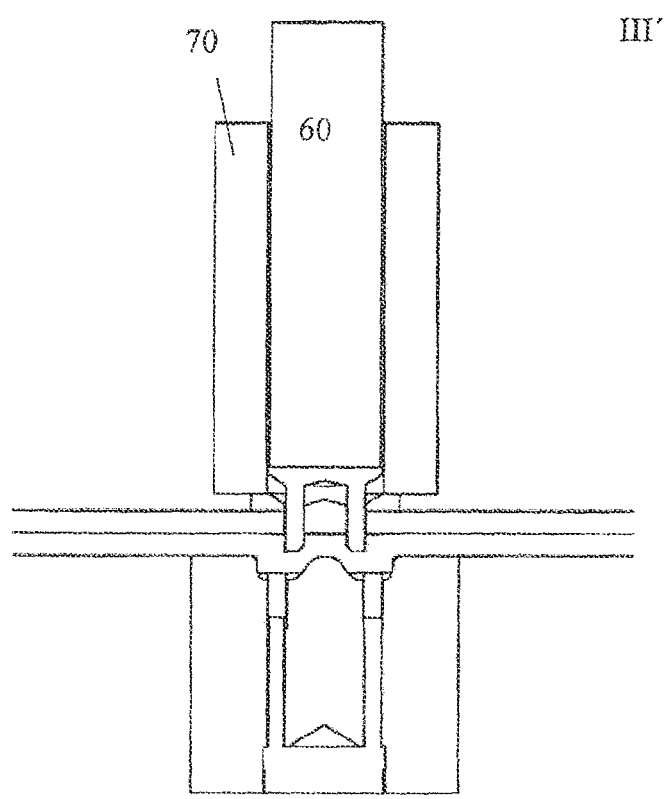
Figure 7:
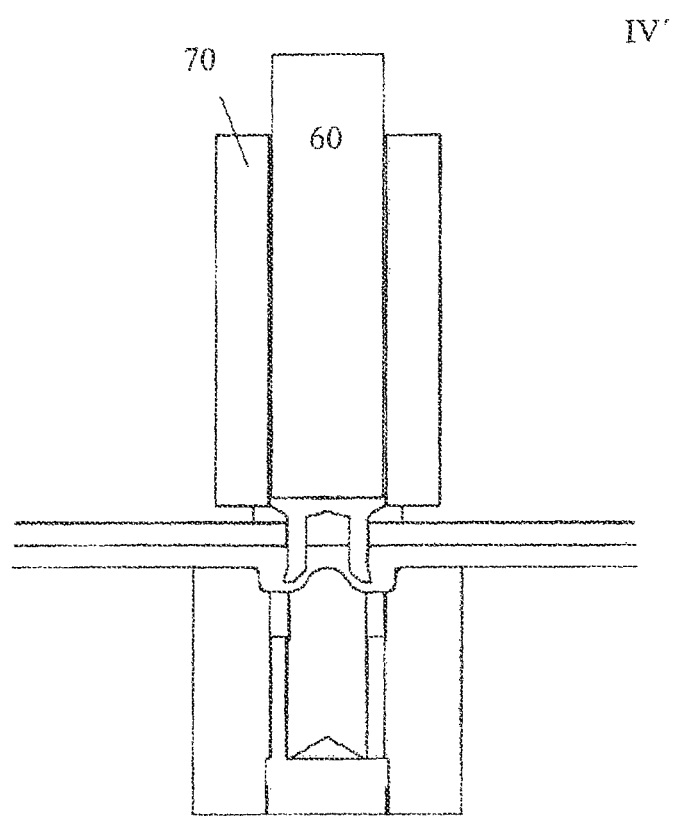
Figure 7:
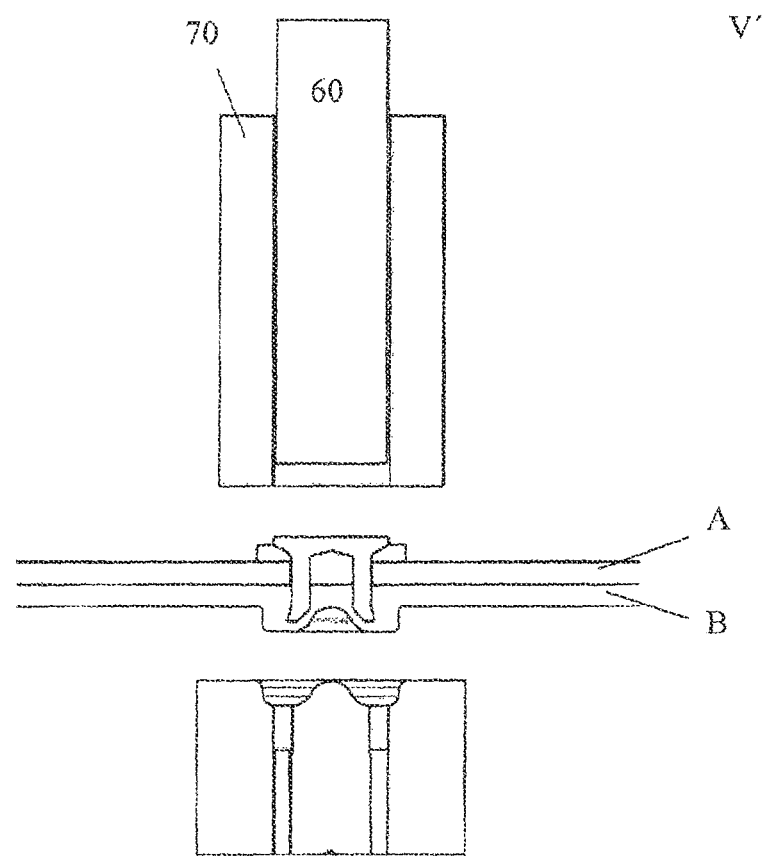
Figure 8:
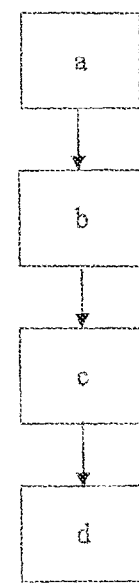
Figure 9:
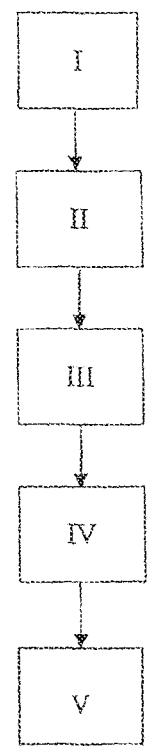
Figure 10:
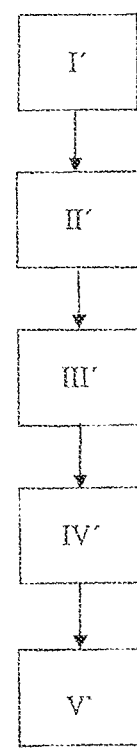

The present invention is now described in detail with reference to the accompanying drawings. It shows:

FIG. 1 a preferred embodiment of a side view of the rivet with pre-punched two-dimensional element, FIG. 2 a side view of the joined rivet of FIG. 1, FIG. 3 a preferred embodiment of the pre-punched two-dimensional element, FIG. 4 a further preferred embodiment of the pre-punched two-dimensional element, FIG. 5a-d sectional views along the line 5-5 of FIG. 4, FIG. 6 I-V a preferred sequential depiction of individual steps when joining the rivet with pre-punched two-dimensional element, FIG. 7 I'-V' a further preferred sequential depiction of the joining of the rivet with pre-punched two-dimensional element, FIG. 8 a flowchart of a preferred embodiment of the production of the rivet with pre-punched two-dimensional element, FIG. 9 a flowchart of a preferred embodiment of the joining method of the rivet with pre-punched two-dimensional element, and FIG. 10 a flowchart of a further preferred embodiment of the joining method of the rivet with pre-punched two-dimensional element, and FIG. 11 a preferred illustration of a clearance.

5. DETAILED DESCRIPTION OF THE PREFERRED EMBODIMENTS

FIG. 1 shows a preferred embodiment of the invention having a rivet 10 and a pre-punched two-dimensional element 30 arranged on a shank 14 of the rivet 10. Preferably, a self-piercing punch rivet or a semi-hollow punch rivet is used as rivet 10 so that in the further course of the description a semi-hollow punch rivet is understood as exemplarily for different rivet types 10. The semi-hollow rivet 10 comprises a head 12 and the shank 14. With respect to the construction of the rivet 10, known shapes are applicable. Accordingly, the rivet 10 comprises for example a flat head according to FIG. 1. Further, a countersunk head or a flat-round head of the punch rivet (not shown) are preferably usable. In a further embodiment of the rivet 10, different shapes of cutting geometries are used at an end 16 of the shank 14 facing away from the head. The cutting geometry is chosen depending on the materials of the components A, B (cf. FIG. 2) to be connected.

As shown in FIGS. 1 and 2, the pre-punched two-dimensional element 30 is arranged on the shank 14 of the rivet 10. The pre-punched two-dimensional element 30 protrudes in radial direction beyond the head radius $R_K$ (cf. FIG. 1) with respect to the shank 14 or the head 12. Due to this construction it is ensured that a tool, preferably a hold-down device, is able to abut the pre-punched two-dimensional element 30 during a joining procedure. By means of the abutment of the hold-down device, the pressure force of the pressuring is directed into the portion below the head 12 of the punch rivet via the pre-punched two-dimensional element 30. In this manner, the joining area of the joining connection to be produced below the head 12 of the punch rivet is compressed by the hold-down device or the tool, and thereby a rising of the top layer is preferably minimized during the joining.

Preferably and according to the invention, the pre-punched two-dimensional element 30 comprises different shapes. For the shaping of the pre-punched two-dimensional element 30, it is essential that it comprises an opening 36 and at least partly a radial extension protruding beyond the head radius $R_K$. Different preferred embodiments of the pre-punched two-dimensional element 30 are shown in FIGS. 3 and 4. FIG. 3 shows the pre-punched two-dimensional element 30' having two diametrically opposite brackets 32. Due to the radial extension of these brackets 32 beyond the head radius $R_K$, these brackets 32 are engageable by a tool or a hold-down device during the joining procedure after installation of the element 30' on the shank 14 or after a separate supply to the setting tool (see below). The brackets 32 transfer the pressure force applied by the tool or the hold-down device to the radial inner ring 34 so that the joining area below the head 12 is compressed during a joining procedure.

According to the preferred embodiment shown in FIG. 4, the pre-punched two-dimensional element 30 has the shape of a disc having a central opening 36. An outer radius $R_A$ of the disc 30 is larger than the above described head radius $R_K$. In this manner, it is ensured that the disc 30 protrudes radially circumferentially beyond the head 12 of the rivet 10. The preferred central opening 36 of the pre-punched two-dimensional element 30; 30' is formed so large that the pre-punched two-dimensional element 30; 30' is arrangeable on the shank 14 of the rivet 10. Preferably, the pre-punched element 30; 30' is arranged captive or non-releasable on the shank 14. This is realized by a frictional connection between the pre-punched two-dimensional element 30; 30' and shank 14 or by retaining the pre-punched two-dimensional element 30; 30' between the head 12 and a widened end of the shank 14 by form-fit/positive-fit.

According to a further preferred embodiment of the pre-punched two-dimensional element 30; 30', the central opening 36 is adapted in its course in thickness direction of the pre-punched two-dimensional element 30; 30' to the shape of the head 12 of the rivet 10. Therefore, the opening 36 is preferably chamfered to accommodate a countersunk head 12 or the opening 36 is formed straight to be adapted to a flat round head.

According to a preferred embodiment of the present invention, the shank 12 of the rivet 10 is widened after arranging the pre-punched two-dimensional element 30; 30' on the shank 12 to fasten the pre-punched two-dimensional element 30; 30' captive on the shank 12. By widening specifically the end 16 of the shank 14 facing away from the head, the pre-punched two-dimensional element 30; 30' is retained captive between the head 12 and the end 16 of the rivet 10 facing away from the head.

In a further embodiment, the pre-punched two-dimensional element 30; 30' is fastened releasably on the shank 14 by means of the radial widening of the shank 14, preferably by means of a prizing open or a compression of the shank. The prizing open or the compression of the shank 14 of the semi-hollow rivet 10 creates preferably a diameter enlargement of the shank 14 above and below the pre-punched two-dimensional element 30; 30' arranged on the shank 14, whereby it is fastened captive. Due to this widening and the diameter enlargement connected therewith above and below the pre-punched two-dimensional element 30; 30', a recess in radial direction is also created in the axial course of the shank 14 into which the material of the components A, B to be joined may flow during the joining procedure. In this manner, an undercut is formed at the shank 14 by means of the in-flowing material of the components A and/or B which supports the strength of the connection between the components A and B.

According to a further embodiment, the prizing open or the compression of the shank 14 creates a thickening of the shank 14 so that the pre-punched element is retained between head 12 and thickening (not shown) on the shank with form-fit, preferably movable.

It is further preferred to fasten the pre-punched two-dimensional element 30 on the shank 14 by means of any frictional connection or by means of an adhesive bond connection as for example gluing. For producing the frictional connection between the shank 14 and the pre-punched two-dimensional element 30; 30', the radius of the opening 36 compared to the shank radius is manufactured with undersize so that the radius of the opening 36 is smaller than the radius of the shank 14 of the rivet 10. By pressing the pre-punched two-dimensional element 30; 30' onto the shank 14, the pre-punched two-dimensional element is fixed on the shank 14.

For supporting this frictional connection between the shank 14 and the pre-punched two-dimensional element 30; 30', it is preferred to provide a shaping of the radial inner side 38, 38', 38", 38'" of the opening 36. In FIGS. 5a-d, different preferred alternatives of the shaping of the radial inner side 38 of the opening 36 are depicted. According to FIG. 5a, the radial inner side 38 extends parallel to the outer surface of the shank 14. According to FIG. 5b, the radial inner side 38' is formed convexly. According to FIG. 5c, the radial inner side 38" is formed concavely. According to FIG. 5d, the radial inner side 38'" of the opening 36 comprises a surface profiling which creates a frictional connection with the surface of the shank 14. The exemplarily embodiments of the surface-shaping of the inner side 38 of the opening 36 shown in FIGS. 5a-d may be fastened on the shank 14 in combination with a shaping of the opening 36 with undersize compared to the diameter of the shank 14 and by a pressing of the pre-punched two-dimensional element 30; 30' onto the shank 14. It is also preferred to form the radius of the opening 36 larger than the radius of the shank 14. For fastening the pre-punched two-dimensional element 30; 30', it is slipped onto the shank 14 and subsequently the shank 14 of the rivet 10 is widened to fasten the pre-punched two-dimensional element 30; 30'.

According to a further preferred embodiment, the pre-punched two-dimensional element 30 is arranged tightly on the shank 14 so that the end 16 of the shank 14 facing away from the head is spaced less than 2/10 of an overall length of the rivet 10 from a side of the pre-punched two-dimensional element 30; 30' facing the end 16 of the shank 14 which is facing away from the head. Such an arrangement supports the joining procedure (see below) and the positioning of the rivet on the components to be connected.

With reference to the above described rivet 10 with pre-punched two-dimensional element 30, preferably with a disc 30, the production thereof may be summarized as follows. First of all, and according to known production methods, a providing of the rivet 10 as well as of the pre-punched two-dimensional element 30 takes place. Preferably, the rivet 10 is produced with the head 12, which is suited for the planned connection. This is a countersunk head, a flat head or a half-round flat head. Exemplarily, FIGS. 1 and 2 show the usage of a flat head 12. Such rivets 10, preferably a semi-hollow rivet, are produced for example by cold-forming or other established methods (step a).

The pre-punched two-dimensional element 30 comprises the opening 36 already described above. For example, and at the disc 30 according to FIG. 4, the opening 36 is arranged centrally and is adapted to the diameter of the shank 14 of the semi-hollow rivet 10. The pre-punched two-dimensional element 30 is now arranged on the shank 14 of the rivet 10 such that the shank 14 extends through the opening 36 of the pre-punched two-dimensional element 30, preferably the disc according to FIG. 4. Due to the radial dimensions of the pre-punched two-dimensional element 30, selected parts or portions of the pre-punched two-dimensional element 30 protrude beyond the head radius $R_K$ of the head 12 of the rivet 10 (step b).

According to a preferred embodiment of the present production method, the pre-punched two-dimensional element 30 is fastened on the shank 14. This takes place preferably by widening the shank 14 of the rivet 10. It is also preferred to provide the opening 36 of the pre-punched two-dimensional element 30 with undersize with respect to the outer diameter of the shank 14 so that the pre-punched two-dimensional element 30 may be pressed onto the shank 14 while simultaneously creating a frictional connection. It is also preferred to fasten the pre-punched two-dimensional element 30 by means of adhesive bonding on the shank 14, preferably by gluing (step c).

It is furthermore preferred to arrange the pre-punched two-dimensional element 30 indeed tight but yet releasable on the shank 14. The initially tight arrangement of the pre-punched two-dimensional element 30 on the shank 14 provides a simplified supply of the rivet 10 to the setting device or to the joining location as well as an easier positioning of the rivet 10 at the joining location. Further, a fixing of the punch rivet via the pre-punched two-dimensional element 30 at the joining location is also facilitated by means of the clamping force of the tool or a hold-down device, if the pre-punched two-dimensional element 30 is fastened on the shank 14. If a punch now sets the rivet 10 into the components to be connected with each other, the connection between shank 14 and pre-punched two-dimensional element 30 is released and the head 12 of the punch rivet moves into the direction of the pre-punched two-dimensional element 30 until the head 12 abuts thereon (step d).

According to a further preferred embodiment, the pre-punched two-dimensional element 30; 30' is arranged on the shank 14 captive and movably (see above).

A summary of the preferred embodiments of the above described production method shows FIG. 8 by means of a flowchart.

FIG. 6 shows a preferred embodiment of a joining method of the present invention. According to this, the rivet 10 is set with its pre-punched two-dimensional element 30 into the two components A, B. It is also preferred to connect more than two components with each other.

Before setting the rivet 10, the at least two components A, B are arranged on a die 80. The die 80 provides the counterforce with respect to the force of the punch 60 when setting the rivet 10 into the components A, B. Further, the die 80 forms a die cavity in which displaced material of the component B on the side of the die is received. In this way, a closing head of the joining connection is formed.

Preferably, the component B on the side of the die consists of ductile material, as for example metal. In this context, and according to an embodiment of the present invention, aluminum is used.

The component A consists preferably of plastic and further preferred of fiber-reinforced plastic. According to a further embodiment of the present invention, the used fiber-reinforced plastic of component A comprises a thermosetting matrix or another matrix-material corresponding to the material requirements of component A. Depending on the materials of the components A, B to be connected, the rivet base geometry as well as the length of the shank 14 of the rivet 10 are adapted to be able to adjust the spread behavior of the rivet 10.

First of all, in step I (cf. FIG. 7) the rivet 10 having its pre-punched two-dimensional element 30 is supplied to a joining location preferably via a preformed channel adapted in its inner shape to the rivet 10 with pre-punched two-dimensional element 30, for example a T-shaped hose, or via a belt strap. The at least two components A, B are support by the die

80. Alternatively thereto, the self-piercing rivet as well as the pre-punched two-dimensional element are supplied individually in step I.

According to an embodiment of the invention, the pre-punched two-dimensional element 30; 30' is arranged on the shank 12 of the rivet 10 before arriving at the joining location. According to a further embodiment, the pre-punched two-dimensional element 30; 30' is supplied to the joining location, pressed against the components A, B by means of a tool or a hold-down device and subsequently, the rivet 10 is set through the pre-punched two-dimensional element 30; 30' into the components A, B to be connected. In this embodiment of the joining method, a two-dimensional element is usable which is not yet pre-punched so that the punch rivet penetrates first of all the two-dimensional element.

Opposite to the die 80, a punch 60 is arranged movably. A tool, preferably a hold-down device 70, surrounds the punch 60 in radial direction and is in the same manner independently from the punch 60 movable into the direction of the components A, B and the die 80. In step I, the hold-down device 70 is moved in the direction of the components A, B, abuts the pre-punched two-dimensional element 30, especially the disc 30, and presses the disc 30 against the components A, B while the components A, B are support by the die 80. In this manner, the joining area below the disc 30 is compressed by means of the hold-down device 70. This prevents a movement of the components A, B during the joining procedure. Further, this compression via the hold-down device 70 and the disc 30 prevents a rising movement of the top-layer of plastic or fiber-reinforced plastic or of the component A.

In step II, the punch 60 moves the rivet 10 through the component A consisting preferably of plastic or fiber-reinforced plastic. Thereby, a slug is punched out of component A and transported further with the rivet 10.

In step III, the rivet 10 penetrates into the second component B consisting of ductile material and deforms it into the cavity of the die 80. This procedure is continued in the steps III and IV until the cavity of the die 80 is filled. In this manner, a closing head of the joining connection is formed. The rivet 10 with disc 30 is completely joined as soon as the head 12 of the rivet 10 abuts the disc 30.

Depending on the choice of the shape of the head 12 of the punch rivet and the shape of the disc 30 or the pre-punched two-dimensional element 30 adapted thereto, a gap-freedom between the components A and B may be controlled. The shape of the head 12 and the disc 30 have an effect especially if the component A consists of fiber-reinforced plastic and the component B of metal. For example, in case a flat round head of the rivet 10 is used in combination with a flat formed pre-punched two-dimensional element 30, an imprinting or an impressing of the head 12 of the rivet 10 into the component A is avoided. This is especially advantageous for fiber-reinforced materials having a thermosetting matrix as component A, as a bending load on the fiber-reinforced plastic of the component A is avoided. In case a flat head with countersunk head radius or a countersunk punch rivet is used, preferably a potential gap between the component A of fiber-reinforced plastic and the component B is closed during the joining procedure. This is especially advantageous for components A made of fiber-reinforced plastic with a thermoplastic matrix as a pre-stressed closed joining connection is created.

Finally, the punch 60 and the hold-down device 70 are moved away from the joining location in step IV so that the created or produced joining connection is released. The above described method is also shown in a summarizing manner in the flowchart of FIG. 8.

FIG. 7 shows a modified preferred embodiment of the joining method according to FIG. 6. At this, the movements of punch 60 and hold-down device 70 in the steps I'-V' are identical to the steps I-V according to FIG. 6, as they are described above.

The die 80' comprises a different functionality. Within the cavity of the die 80', preferably a movable supporting element 90 is arranged. The supporting element 90 works against a deformation of the ductile component B so that thereby a deformation of component B into the cavity of the die 80' is controllable or may be regulated. In general, thereby preferably the deformation into the cavity of the die 80' may be decelerated.

The supporting element 90 is preferably arranged so that a cutting clearance or clearance S is reduced. Exemplarily, the clearance S is depicted in FIG. 11. The clearance S denotes the distance between the radial outer surface of the shank 14 and the radial outer edge of the die 80'. The clearance S facilitates disadvantageous bending moments in the components A, B to be connected with each other so that its specific reduction by means of the supporting element 90 is advantageous.

By means of the movement of the punch 60, the rivet 10 is moved in the direction of the die 80'. Thereby, component B is deformed and a disadvantageous deforming moment occurs between the radial outside of the die 80' and the radial outside of the shank 14. The supporting element 90 is now preferably arranged such that it supports the component B within the cavity of the die 80' in the portion between the radial outside of the shank 14 and the radial inner side of the die 80'. Via a reduction of the clearance S, a clean cut of the rivet 10 through the component A takes place while the supporting part 90 supports the component B (step II').

For not preventing and/or influencing in a controlled manner the formation of the closing head and the flowing of material from component B into the cavity of the die 80', the supporting part moves away from component B depending on the movement of the punch 60 in the steps III' and IV' and/or depending on the in-flowing of material from component B into the cavity of the die.

For constructively realizing the defined release or uncovering of the cavity of the die 80' by means of the supporting element 90, the supporting element 90 is realized according to different embodiments. According to the embodiment generally shown in FIG. 7, the supporting element 90 is formed tubular and arranged linear movable in joining direction of the punch 60. The supporting element 90 protrudes against the joining direction into the cavity of the die 80'. By moving into the joining direction, the supporting element 90 releases or uncovers the cavity of the die 80'.

The release of the cavity of the die 80' by the supporting element 90 preferably takes place controlled or regulated. For example, the supporting element 90 releases the die 80' depending on the different deformation behavior of the components A, B to be connected. According to a further embodiment, the supporting element 90 and thus the die 80' creates a defined counterforce in the direction of the components A, B which are deformed into the cavity of the die 80'. This counterforce is varied for example according to a predefined force profile so that the supporting element 90 is moved depending on the counterforce. In this manner, the die 80' with supporting element 90 is adaptable to the different materials and their deformation behavior.

Besides the controlled or regulated movement of the supporting element 90 at least partly into the cavity of the die 80 and out of it, different constructions of the supporting element 90 are preferred, which support this movement. It is for example preferred, based on a specific construction of the supporting element 90, to move it parallel (see above), transversely or angularly to the joining direction of the punch 60 to release the cavity of the die 80' and/or to vary the size of the clearance. Alternatively thereto, also combinations of these movements are preferred.

According to further device and method alternatives, the movement of the supporting element 90 out of the cavity of the die 80' takes place against a constant or variably controlled spring force. This spring force is applied preferably mechanically, hydraulically or electromechanically. It is also preferred to unlock the supporting element 90 or to make it force-free for releasing the cavity of the die 80' so that it is displaceable by the material or the components A, B displaced into the cavity of the die 80'.

In step V', the punch 60, the hold-down device 70 and the supporting element 90 are removed from the joining location.

Thus, the rivet 10 with the pre-punched two-dimensional element 30 is preferably set by a setting device of known type in combination with the die 80' with movable supporting element 90. Such setting devices comprise a punch 60 and a hold-down device 70, which are movable hydraulically, electromechanically or via other driving principles.

It is also preferred to use the above described joining method as well as the above described setting method for a punch rivet not comprising a pre-punched two-dimensional element 30 or is set in combination therewith.

LIST OF REFERENCE SIGNS 2 closing head
10 rivet
12 head
14 shank
16 end of the shank 14 facing away from the head
30, 30' pre-punched two-dimensional element, disc
32 bracket
34 torus
36 opening
38, 38', 38'', 38''' inner side of the opening 36
60 punch
70 hold-down device
80, 80' die
90 supporting element
A, B component
S clearance
$R_K$ head radius
$R_A$ outer radius

The invention claimed is:

1. A rivet, especially a self-piercing rivet, comprising the following features:
   a head and a shank as well as
   a pre-punched two-dimensional element which is arranged on the shank and which protrudes radially at least partly beyond a head radius with respect to the head wherein the pre-punched two-dimensional element is arranged captive between the head and an end of the shank facing away from the head so that the combination of the self-piercing rivet and the pre-punched two-dimensional element may be supplied to a setting device or a joining location.

2. Rivet according to claim 1, wherein the pre-punched two-dimensional element is fastened between the head and an end of the shank facing away from the head.

3. Rivet according to claim 2, wherein the end of the shank facing away from the head is spaced less than $2/10$ of an overall length of the shank from a side of the pre-punched two-dimensional element facing the end of the shank which is facing away from the head.

4. Rivet according to claim 3, wherein an end radius of the end of the shank facing away from the head is larger than a shank radius of the shank between the head and the end of the shank facing away from the head.

5. Rivet according to claim 2, wherein an end radius of the end of the shank facing away from the head is larger than a shank radius of the shank between the head and the end of the shank facing away from the head.

6. Rivet according to claim 5, wherein the pre-punched two-dimensional element is a circular or a polygonal or an oval or a dumbbell-shaped disc with a central opening, through which the shank of the rivet extends and which protrudes to an extent beyond the head radius so that the disc may be abutted by a tool.

7. Rivet according to claim 2, wherein the pre-punched two-dimensional element is a circular or a polygonal or an oval or a dumbbell-shaped disc with a central opening, through which the shank of the rivet extends and which protrudes to an extent beyond the head radius so that the disc may be abutted by a tool.

8. Rivet according to claim 3, wherein the pre-punched two-dimensional element is a circular or a polygonal or an oval or a dumbbell-shaped disc with a central opening, through which the shank of the rivet extends and which protrudes to an extent beyond the head radius so that the disc may be abutted by a tool.

9. Rivet according to claim 4, wherein the pre-punched two-dimensional element is a circular or a polygonal or an oval or a dumbbell-shaped disc with a central opening, through which the shank of the rivet extends and which protrudes to an extent beyond the head radius so that the disc may be abutted by a tool.

10. Rivet according to claim 1, wherein the pre-punched two-dimensional element is a circular or a polygonal or an oval or a dumbbell-shaped disc with a central opening, through which the shank of the rivet extends and which protrudes to an extent beyond the head radius so that the disc may be abutted by a tool.

11. At least a first and a second component connected to each other via a rivet according to claim 1.

12. Rivet according to claim 1, wherein an end radius of the end of the shank facing away from the head is larger than a shank radius of the shank between the head and the end of the shank facing away from the head.

13. Rivet according to claim 12, wherein the pre-punched two-dimensional element is a circular or a polygonal or an oval or a dumbbell-shaped disc with a central opening, through which the shank of the rivet extends and which protrudes to an extent beyond the head radius so that the disc may be abutted by a tool.

* * * * *